United States Patent [19]

Lee

[11] Patent Number: 4,982,116
[45] Date of Patent: Jan. 1, 1991

[54] CLOCK SELECTION CIRCUIT

[75] Inventor: Minru Lee, San Jose, Calif.

[73] Assignee: Linear Technology Corporation, Milpitas, Calif.

[21] Appl. No.: 457,157

[22] Filed: Dec. 26, 1989

[51] Int. Cl.[5] .................... H03K 3/027; H03K 17/04
[52] U.S. Cl. .................................. 307/480; 307/269; 307/441; 307/296.4
[58] Field of Search ............... 307/272.3, 296.5, 594, 307/597, 480, 353, 269, 219, 262, 441, 296.4, 296.5, 480; 328/104, 137; 331/49

[56] References Cited

U.S. PATENT DOCUMENTS

| | | | |
|---|---|---|---|
| 4,365,174 | 12/1982 | Kucharewski | 307/353 |
| 4,553,054 | 11/1985 | Kase et al. | 307/597 |
| 4,886,983 | 12/1989 | Taka | 307/296.5 |

Primary Examiner—John S. Heyman
Assistant Examiner—Toan Tran
Attorney, Agent, or Firm—Flehr, Hohbach, Test, Albritton & Herbert

[57] ABSTRACT

A clock selection circuit having a single input terminal for receiving an external clock signal and including logic means for selectively passing an external clock signal and an internal clock signal to an output. A clock detector is connected to the input terminal for generating a voltage in response to an external clock signal. The generated voltage is utilized in controlling the logic circuitry in selectively passing the external clock signal or the internal clock signal. In a preferred embodiment, the logic circuitry includes a first two input NAND gate, a second two input NAND gate, and a third two input NAND gate. One input of the first NAND gate receives the external clock signal, and one input to the second NAND gate receive sthe internal clock. The two outputs of the first and second NAND gates are connected to the inputs of the third NAND gate. The output from the clock detector is connected to the other input of the first NAND gate and is connected through an inverter to the other input of the second NAND gate.

5 Claims, 2 Drawing Sheets

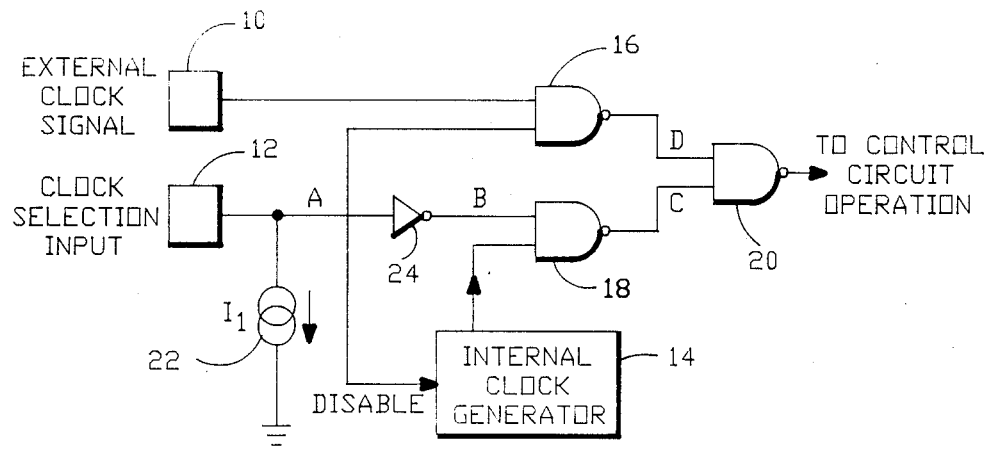
( PRIOR ART )
FIG.—1
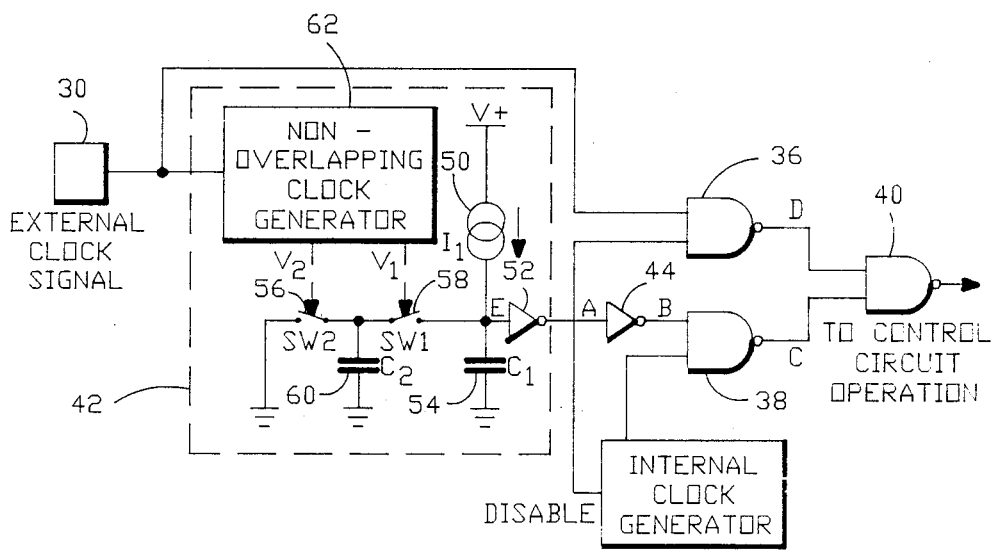
FIG.—3
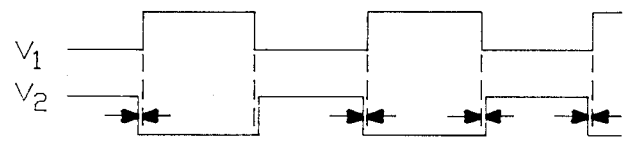
FIG.—4

CLOCK SELECTION CIRCUIT

BACKGROUND OF THE INVENTION

This invention relates generally to clock circuits as used in electronic integrated circuits, and more particularly, the invention relates to clock selection circuits which allow internal clock operation or external clock operation.

In many electronic circuits, digital clock signals are required to control functional operations of various subcircuit blocks. To ease user interface requirements, clock signals are often provided by internal clock generators. However, since the same circuit may require different types of clock signals is different applications, it is usually desirable to provide the circuit with an access input port so that the user can, when necessary, apply an external clock signal to satisfy the needs of a particular application. When an external clock signal is chosen rather than the internal clock, the internal clock generator is normally disabled to prevent it from interfering with circuit operation. Therefore, a circuit with an optional external clock access conventionally requires two input ports, namely one for applying the external clock signal and the other for clock selection input which is applied externally to disable the internal clock generator circuitry.

The use of two input ports for external clock operation has several drawbacks. First, many packages semiconductor integrated circuits are limited in the number of pins available. Secondly, an additional clock selection input is required to determine whether internal or external clock signal is selected. Further, if noise accidentally gets into the signal selection pin when the selection pin is left open, internal oscillator operation can be momentarily disabled thus interrupting the control clock.

SUMMARY OF THE INVENTION

An object of the present invention is an improved clock selection circuit.

Another object of the invention is a circuit operable with an internal clock and with an external clock while requiring a single external clock terminal.

Still another object of the invention is a clock selection circuit which is immune from noise when activating an internal clock.

Briefly, a clock selection circuit in accordance with the invention is operable with an internal clock and an external clock while requiring only a single input clock terminal. In the absence of an external clock signal, logic circuitry is activated to permit signals from an internal clock to be applied to an electronic circuit. In the presence of an external clock signal, the logic circuitry blocks application of the internal clock signal, and permits application of the external clock signal to the electronic circuitry.

More particularly, in a preferred embodiment, first and second two input NAND gates have outputs connected to the inputs of a third two-input NAND gate. One input of the first NAND gate is connected to an external clock pin to receive an external clock signal, and one input of the second NAND gate is connected to receive an internal clock signal. A clock detector circuit is connected to the external clock pin for detecting the presence of an external clock signal. A clock detector circuit can comprise a frequency-to-voltage converter whereby absence of the external clock generates a low or ground voltage and presence of the external clock signal generates a high voltage.

In the absence of the external clock signal, the low voltage output of the clock detector circuit is applied to the second input of the first NAND gate thereby forcing the output of the first NAND gate to a high output voltage level. The low voltage from the clock detector circuit is inverted to a high voltage which is applied to the second input of the second NAND gate. This enables the internal clock signal which is applied to the second and third NAND gates to control an electronic circuit.

In the presence of the external clock signal, the high output of the clock detector circuit disables the internal clock and enables the external clock path through the first and third NAND gates.

The invention and objects and features thereof will be more readily apparent from the following detailed description and appended claims when taken with the drawing.

BRIEF DESCRIPTION OF THE DRAWING

FIG. 1 is a schematic diagram of a conventional clock selection circuit.

FIG. 3 is a more detailed schematic diagram of the circuit of FIG. 2.

FIG. 4 are voltages generated in the circuit of FIG. 3.

DETAILED DESCRIPTION ILLUSTRATED EMBODIMENT

Figure 2:
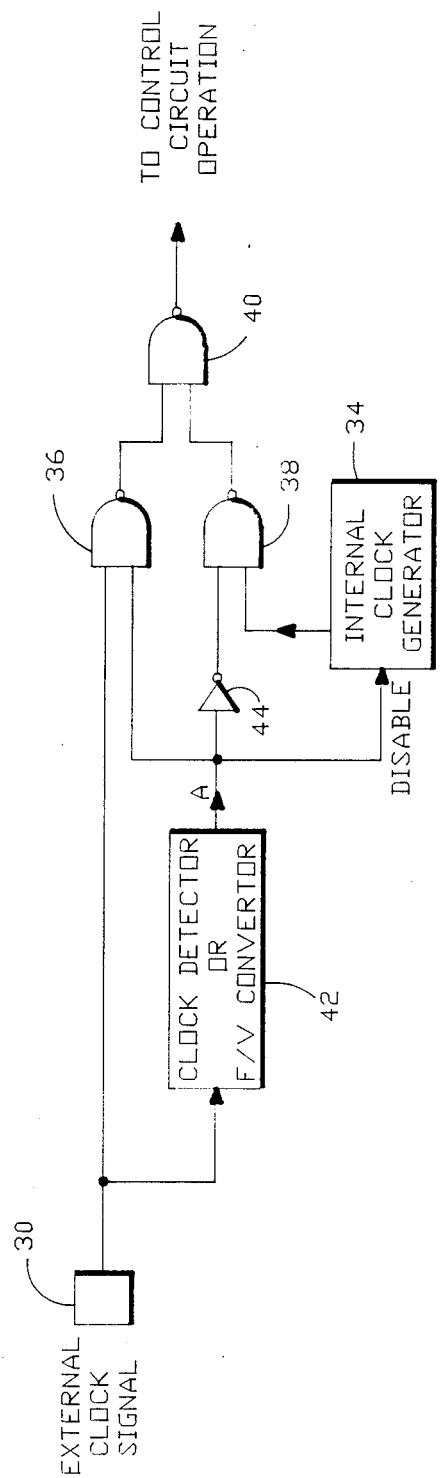
FIG. 2 is a schematic diagram of a clock selection circuit in accordance with the present invention.

Referring now to the drawing, FIG. 1 is a schematic diagram of a clock selection circuit in accordance with the prior art. Typically, such a circuit would be part of a packaged semiconductor integrated circuit with two pins 10 and 12 provided on the package for receiving an external clock signal and a clock selection input, respectively. The circuit includes an internal clock generator 14, and the clock selection input 12 is utilized to control the selection of the external clock signal 10 or the internal clock generator signal 14.

Clock selection is effected by a logic circuit including a first NAND gate 16, a second NAND gate 18, and a third NAND gate 20. The external clock signal at terminal 10 is connected to one input of NAND gate 16, and the internal clock signal from generator 14 is applied as one input to NAND gate 18. The outputs of the two NAND gates 16, 18 are applied as the inputs to NAND gate 20, and the output of NAND gate 20 is the internal clock signal or the external clock signal as selected.

In operation, when an external clock is not needed, the selection input at 12 is brought to a low voltage level, a logic "0", or is left open. When left open, the selection input pin is pulled down to a low voltage by a current source 22. With node A low, inverter 24 makes node B high and node D at the output of NAND gate 16 will be high, or a logic "1". The internal clock signal then feeds through NAND gates 18 and 20 to control circuit operation.

Conversely, when an external clock signal is applied, node A at the terminal 12 is connected to a high level or a logic "1". Node B is at a low level while node C is at a high level. Thus, a logic "1" at node A disables the internal clock generator and enables the external clock which feeds through NAND gates 16 and 20 to control circuit operations.

As noted above, the need for two input ports to control the clock signals has a number of drawbacks. First, the number of pins available in a packaged integrated circuit are limited by the package type used. Secondly, an additional clock selection input is required to determine whether an internal or external clock is selected. Further, if noise accidentally gets into the signal selection pin when the selection pin is left open, the internal oscillator can be momentarily disabled, thus interrupting the control clock.

FIG. 2 is a schematic diagram of a clock selection circuit in accordance with the present invention which requires only one input port 30 for the external clock signal. Again, an internal clock generator 34 is provided with NAND gates 36, 38, and 40 selectively applying either the external clock from terminal 30 or the internal clock signal to control circuit operation at the output of NAND gate 40. The circuit further includes a clock detector or frequency-to-voltage convertor 42 which effectively replaces the clock selection input terminal. When the clock detector detects an incoming AC signal, its output, node A, is driven to a high level and disables the internal clock generator 34 through the NAND gate circuitry as described above. Conversely, when the clock detector 42 does not detect an incoming AC signal, its output (node A) is at a low voltage level.

FIG. 3 is a more detailed schematic diagram of the circuitry of FIG. 2 showing one embodiment of a suitable clock detector or frequency-to-voltage converter 42. The converter includes a current source 50 which is connected to the input of an inverter 52 and a capacitor 54 which is connected to ground. Two switches 56 and 58 are alternately toggled when an external clock signal is present. The common terminal of the two switches is connected through capacitor 60 to ground and one terminal of switch 56 is connected directly to ground.

When an external clock signal is applied to the input pin 30, a non-overlapping clock generator 62 produces two non-overlapping clock signals V1 and V2 as shown in FIG. 4. The two signals V1 and V2 are out of phase and are both at low level for a short period when changing states. The two signals control the on and off of the switches 56 and 58, and the non-overlapping nature of the two clock signals guarantees that the two switches are never closed at the same time. When switch 56 is closed and switch 58 is open, capacitor 60 is connected to ground through switch 56 and capacitor 54 is allowed to charge by the current source 50. Then, when switch 58 is closed after switch 56 is opened, a certain percentage of the charge stored on capacitor 54 flows to capacitor 60, which is later dumped into ground after switch 58 is again opened and switch 60 is closed. Discharging of capacitor 54 by the two switches and capacitor 60 will give node E at the input of inverter 52 an average voltage of $$V = I_1/(f \cdot C_{60})$$

where f is the frequency of clock signals V1 and V2. Above a certain frequency, the voltage on node E is lower than the threshold voltage of inverter 52. Node A and node C will be at a high level while node B is a low level. A high voltage at node A disables the internal clock generator and the external clock signal feeds through NAND gates 36 and 40 to control the circuit operation.

There has been described an improved clock selection circuit which requires a single external clock signal terminal. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A clock selection circuit comprising
    a terminal for receiving an external clock signal,
    an output,
    a clock signal detector connected to said terminal and generating a voltage in response to the presence of an external clock signal,
    an internal clock generator for generating an internal clock signal, and
    logic means connected to said terminal for receiving an external clock signal, connected to said internal clock generator for receiving said internal clock signal, and connected to receive the voltage from said clock signal detector and controlled thereby to automatically switch to said internal clock signal from said internal clock generator upon said voltage reaching a predetermined logic state or a received external clock signal to said output.

2. The clock selection circuit as defined by claim 1 wherein said logic means includes a first NAND gate, a second NAND gate, and a third NAND gate, means connecting said external clock signal to one input of said first NAND gate, means connecting said internal clock signal to one input of said second NAND gate, means connecting outputs of said first and second NAND gates to inputs of said third NAND gate, and means connecting said clock signal detector to an input of said first NAND gate and to an input of said second NAND gate.

3. The clock selection circuit as defined by claim 2 wherein said internal clock generator includes a disable terminal, and further including means connecting said clock signal detector to said disable terminal.

4. The clock selection circuit as defined by claim 2 wherein said clock signal detector includes
    a non-overlapping clock generator for generating two non-overlapping signals in response to an external clock signal,
    charge storage means,
    means connected to said charge storage means responsive to said two non-overlapping signals for discharging said charge storage means.

5. The clock selection circuit as defined by claim 4 and further including an inverter connected to said charge storage means for inverting a voltage stored thereon, said inverter reconnected to the output of said clock signal detector.

* * * * *

UNITED STATES PATENT AND TRADEMARK OFFICE
CERTIFICATE OF CORRECTION

PATENT NO. :  4,982,116

DATED      :  January 1, 1991

INVENTOR(S) :  Minru Lee

It is certified that error appears in the above-identified patent and that said Letters Patent is hereby corrected as shown below:

column 1, line 15, change "is" to --in-- column 1, line 29, "packages" should be changed to --packaged--

Signed and Sealed this

First Day of September, 1992

*Attest:*

DOUGLAS B. COMER

*Attesting Officer*      *Acting Commissioner of Patents and Trademarks*